United States Patent
Shao

(10) Patent No.: US 10,540,306 B2
(45) Date of Patent: Jan. 21, 2020

(54) DATA COPYING METHOD, DIRECT MEMORY ACCESS CONTROLLER, AND COMPUTER SYSTEM

(71) Applicant: Huawei Technologies Co., Ltd., Shenzhen (CN)

(72) Inventor: Fei Shao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 294 days.

(21) Appl. No.: 15/197,315

(22) Filed: Jun. 29, 2016

(65) Prior Publication Data

US 2017/0004101 A1 Jan. 5, 2017

(30) Foreign Application Priority Data

Jun. 30, 2015 (CN) .......................... 2015 1 0374397

(51) Int. Cl.
*G06F 13/28* (2006.01)
*G06F 12/0806* (2016.01)

(52) U.S. Cl.
CPC .......... *G06F 13/28* (2013.01); *G06F 12/0806* (2013.01); *G06F 2212/6042* (2013.01)

(58) Field of Classification Search
CPC .................. G06F 13/28; G06F 12/0806; G06F 2212/6042
See application file for complete search history.

(56) References Cited

U.S. PATENT DOCUMENTS

| | | | | |
|---|---|---|---|---|
| 6,601,134 B1* | 7/2003 | Yamagami | ............... | G06F 3/061 711/111 |
| 2009/0216957 A1* | 8/2009 | Chaussade | .......... | G06F 12/0835 711/141 |
| 2012/0297043 A1* | 11/2012 | Davis | ...................... | H04L 45/60 709/223 |
| 2014/0201761 A1* | 7/2014 | Dalal | ...................... | G06F 13/16 718/108 |

FOREIGN PATENT DOCUMENTS

| | | |
|---|---|---|
| CN | 101266585 A | 9/2008 |
| CN | 103440208 A | 12/2013 |
| CN | 103473057 A | 12/2013 |

* cited by examiner

*Primary Examiner* — Henry Tsai
*Assistant Examiner* — John B Roche
(74) *Attorney, Agent, or Firm* — Leydig, Voit & Mayer, Ltd.

(57) ABSTRACT

The present invention provides a data copying method, a direct memory access controller, and a computer system. The data copying method of embodiments of the present invention includes reading, by a DMA controller, target data from storage space corresponding to a source physical address of the target data by using an ACP, where the storage space corresponding to the source physical address includes a first buffer; and storing, by the DMA controller, the target data into storage space corresponding to a destination physical address of the target data by using the ACP, where the storage space corresponding to the destination physical address includes a second buffer. The embodiments of the present invention can lower CPU usage.

9 Claims, 5 Drawing Sheets

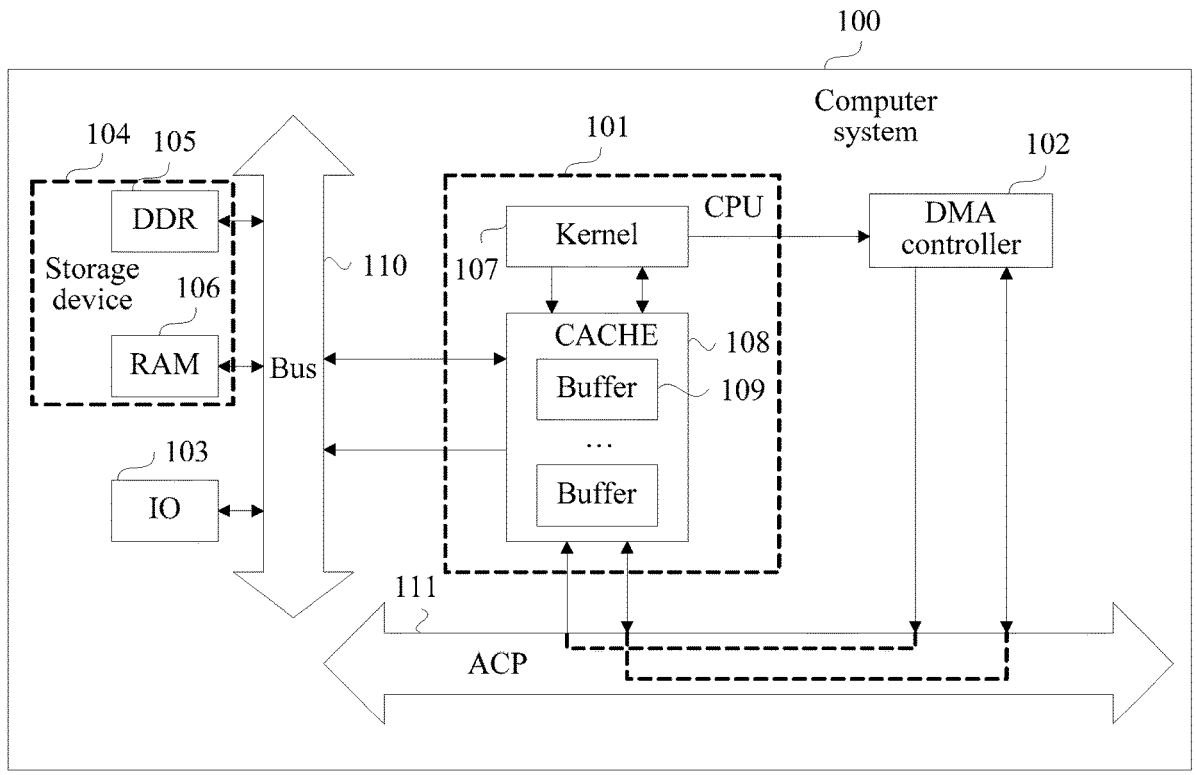

FIG. 1

A DMA controller reads target data from storage space corresponding to a source physical address of the target data by using an ACP, where the storage space corresponding to the source physical address includes a first buffer — S201

The DMA controller stores the target data into storage space corresponding to a destination physical address of the target data by using the ACP, where the storage space corresponding to the destination physical address includes a second buffer — S202

FIG. 2

DATA COPYING METHOD, DIRECT MEMORY ACCESS CONTROLLER, AND COMPUTER SYSTEM

CROSS-REFERENCE

This application claims priority to Chinese Patent Application No. 201510374397.5, filed on Jun. 30, 2015, which is hereby incorporated by reference in its entirety.

TECHNICAL FIELD

The present invention relates to the field of computers, and in particular, to a data copying method, a direct memory access controller, and a computer system.

BACKGROUND

A computer system allocates buffers (buffer) to running processes, and each process accesses a respective buffer during running and reads data from or writes data into the respective buffer.

However, same data may be accessed by different processes; in this case, the computer system needs to copy data stored in a buffer of one process into a buffer of another process, so that the another process acquires the data by accessing the buffer of the another process. Specifically, a central processing unit (CPU) performs the copy operation.

Copying data between buffers of any two processes requires participation of a CPU. With an increasing number of functions that the computer system implements, interaction between processes becomes more frequent. Therefore, copying data causes relatively high CPU usage, and further affects working performance of the computer system.

SUMMARY

The present invention provides a data copying method, a direct memory access controller, and a computer system, to improve working performance of a computer.

According to a first aspect, an embodiment of the present invention provides a data copying method, including:

reading, by a direct memory access (DMA) controller, target data from storage space corresponding to a source physical address of the target data by using an accelerator coherency port (ACP), where the storage space corresponding to the source physical address includes a first buffer; and storing, by the DMA controller, the target data into storage space corresponding to a destination physical address of the target data by using the ACP, where the storage space corresponding to the destination physical address includes a second buffer.

According to the first aspect, in a first possible implementation manner of the first aspect, the reading, by a DMA controller, target data from storage space corresponding to a source physical address of the target data by using an ACP includes:

sending, by the DMA controller, a source virtual address of the target data to a memory management unit MMU, so that the MMU converts the source virtual address into the source physical address and sends the source physical address to a cache controller by using the ACP; and receiving, by the DMA controller, the target data that is returned by the cache controller by using the ACP and the MMU in sequence, where the target data is data that is stored in the storage space corresponding to the source physical address and that is read by the cache controller from the first buffer, or the target data is data that is stored in the storage space corresponding to the source physical address and that is read by the cache controller from an input output TO device or a storage device corresponding to the first buffer.

According to the first possible implementation manner of the first aspect, in a second possible implementation manner, the storing, by the DMA controller, the target data into storage space corresponding to a destination physical address of the target data by using the ACP includes:

sending, by the DMA controller, the target data and a destination virtual address of the target data to the MMU, so that the MMU converts the destination virtual address into the destination physical address and sends the target data and the destination physical address to the cache controller by using the ACP, where the target data and the destination physical address are used to enable the cache controller to write the target data into the storage space that corresponds to the destination physical address and that is in the second buffer, or write the target data into the storage space that corresponds to the destination physical address and that is in an TO device or a storage device corresponding to the second buffer.

According to the second possible implementation manner of the first aspect, in a third possible implementation manner, before the sending, by the DMA controller, a source virtual address of the target data to the MMU, the method further includes:

receiving, by the DMA controller, configuration information, sent by a central processing unit CPU, of a transmission channel, where the configuration information includes: the source virtual address and the destination virtual address, and the transmission channel is a data transmission channel that is in the DMA controller and that corresponds to the target data;

configuring, by the DMA controller, a source address of the transmission channel as the source virtual address; and configuring, by the DMA controller, a destination address of the transmission channel as the destination virtual address.

According to a second aspect, an embodiment of the present invention provides a direct memory access DMA controller, including:

a read module, configured to read target data from storage space corresponding to a source physical address of the target data by using an accelerator coherency port ACP, where the storage space corresponding to the source physical address includes a first buffer; and a write module, configured to store the target data into storage space corresponding to a destination physical address of the target data by using the ACP, where the storage space corresponding to the destination physical address includes a second buffer.

According to the second aspect, in a first possible implementation manner of the second aspect, the DMA controller further includes:

a sending module, configured to send a source virtual address of the target data to a memory management unit MMU, so that the MMU converts the source virtual address into the source physical address and sends the source physical address to a cache controller by using the ACP; and a receiving module, configured to receive the target data that is returned by the cache controller by using the ACP and the MMU in sequence, where the target data is data that is stored in the storage space corresponding to the source physical address and that is read by the cache controller from the first buffer, or the target data is data that is stored in the storage space corresponding to the source physical address and that is read by the cache controller from an input output IO device or a storage device corresponding to the first buffer.

According to the first possible implementation manner of the second aspect, in a second possible implementation manner, the sending module is further configured to send the target data and a destination virtual address of the target data to the MMU, so that the MMU converts the destination virtual address into the destination physical address and sends the target data and the destination physical address to the cache controller by using the ACP, where the target data and the destination physical address are used to enable the cache controller to write the target data into the storage space that corresponds to the destination physical address and that is in the second buffer, or write the target data into the storage space that corresponds to the destination physical address and that is in an IO device or a storage device corresponding to the second buffer.

According to the second possible implementation manner of the second aspect, in a third possible implementation manner, the receiving module is further configured to: before the sending module sends the source virtual address of the target data to the MMU, receive configuration information, sent by a central processing unit CPU, of a transmission channel, where the configuration information includes the source virtual address and the destination virtual address, and the transmission channel is a data transmission channel that is in the DMA controller and that corresponds to the target data; and the DMA controller further includes:

a configuration module, configured to configure a source address of the transmission channel as the source virtual address and configure a destination address of the transmission channel as the destination virtual address.

According to a third aspect, an embodiment of the present invention further provides a computer system, including: a direct memory access DMA controller, an accelerator coherency port ACP, and a buffer memory, where the DMA controller is connected to the buffer memory by using the ACP; the buffer memory includes a first buffer and a second buffer; and the DMA controller is any DMA controller described above.

In the data copying method provided in the embodiments of the present invention, a DMA controller reads, by using an ACP, target data from storage space that corresponds to a source physical address of the target data and that is in a first buffer, and then stores, by using the ACP, the target data into storage space that corresponds to a target physical address of the target data and that is in a second buffer, to complete copying data between the first buffer and the second buffer without using a CPU to copy data, thereby lowering a CPU usage ratio.

BRIEF DESCRIPTION OF DRAWINGS

To describe the technical solutions in the embodiments of the present invention or in the prior art more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

FIG. 1 is a schematic diagram of a computer system to which a data copying method is applied according to the present invention;

FIG. 2 is a flowchart of a data copying method according to Embodiment 1 of the present invention;

DESCRIPTION OF EMBODIMENTS

Figure 3:
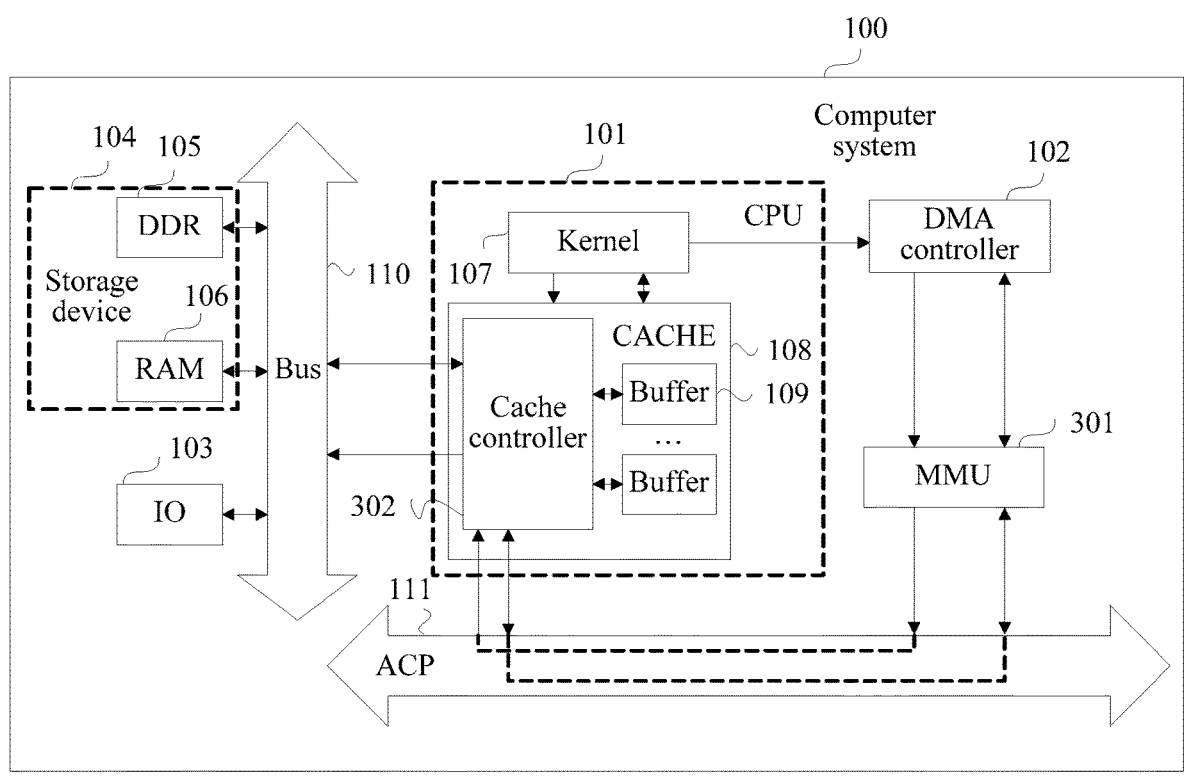
FIG. 3 is a schematic diagram of a computer system to which another data copying method is applied according to the present invention.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

FIG. 1 is a schematic diagram of a computer system to which a data copying method according to the present invention is applied. As shown in FIG. 1, a computer system 100 includes a central processing unit (CPU) 101, a direct memory access (DMA) controller 102, an input output (IO) device 103, and a storage device 104. The storage device 104 may include: a dual data rate (DDR) synchronous dynamic random access memory 105, a random access memory (RAM) 106, and the like. The CPU 101 includes a kernel 107 and a cache memory (CACHE) 108. The cache memory 108 may include at least two buffers 109. The DMA controller 102 may communicate with the buffers 109 in the cache memory 108 of the CPU. The CPU 101 may access the storage device 104 and the IO device 103 by using a bus 110. The DMA controller 102 may communicate with the buffers 109 in the cache memory 108 by using an accelerator coherency port (ACP) 111. FIG. 2 is a flowchart of a data copying method according to Embodiment 1 of the present invention. As shown in FIG. 2, the data copying method may include:

S201: A DMA controller reads target data from storage space corresponding to a source physical address of the target data by using an ACP, where the storage space corresponding to the source physical address includes a first buffer.

S202: The DMA controller stores the target data into storage space corresponding to a destination physical address of the target data by using the ACP, where the storage space corresponding to the destination physical address includes a second buffer.

Specifically, the first buffer may be a buffer corresponding to a first process, and the second buffer may be a buffer corresponding to a second process. The source physical address of the target data may be an address at which the target data is stored in the storage space corresponding to the source physical address. The storage space corresponding to the source physical address includes the first buffer, and the source physical address of the target data may be an address at which the target data is stored in the first buffer. The destination physical address of the target data may be an address at which the target data is going to be stored in the storage space corresponding to the destination physical address. The storage space corresponding to the destination physical address may include the second buffer, and the destination physical address of the target data may be an address at which the target data is going to be stored in the second buffer.

The target data may include at least one piece of data. If the target data includes one piece of data, the source physical address of the target data and the destination physical address of the target data may separately include one address. If the target data includes at least two pieces of data, the source physical address of the target data may include at least two addresses, which respectively are storage addresses that correspond to data of the at least two pieces of data; physical addresses of the target data may also include at least two addresses, which respectively are addresses at which data of the at least two pieces of data is going to be stored.

For example, if data in a buffer of a process 1 needs to be accessed by a process 2, the data in the buffer of the process 1 needs to be copied to a buffer of the process 2. The to-be-copied data in the buffer of the process 1 is the target data. The source physical address of the target data may be an address corresponding to storage space that stores the target data and that is in the buffer of the process 1. The destination physical address of the target data may be an address corresponding to storage space that corresponds to the target data and that is in the buffer of the process 2.

If one piece of data in the buffer of the process 1 needs to be copied to the buffer of the process 2, the one piece of data in the buffer of the process 1 is the target data. If the one piece of target data is stored in storage space that corresponds to an address 0000 and that is in the buffer of the process 1, the source physical address of the target data is the address 0000. If the one piece of data is copied into storage space that corresponds to an address 2000 and that is in the buffer of the process 2, the destination physical address of the target data is the address 2000.

If 17 pieces of data in the buffer of the process 1 need to be copied to the buffer of the process 2, the 17 pieces of data in the buffer of the process 1 are the target data. If the 17 pieces of target data are separately stored in storage space that corresponds to addresses 0000 to 0011 and that is in the buffer of the process 1, the source physical address of the target data is the addresses 0000 to 0011. If the 17 pieces of data are separately copied into storage space that corresponds to addresses 2000 to 2011 and that is in the buffer of the process 2, the destination physical address of the target data is the addresses 2000 to 2011.

Code of processes running in the computer system is known before data is copied. Therefore, when the data is copied between buffers corresponding to the processes, addresses of the buffers corresponding to the processes are known. The source physical address of the target data and the destination physical address of the target data may be determined according to the known addresses of the buffers corresponding to the processes.

That a DMA controller reads target data from storage space corresponding to a source physical address of the target data by using an ACP in S201 may be, for example: The DMA controller sends a data read request message including the source physical address of the target data to a cache controller by using the ACP, so that the cache controller reads the target data from the storage space corresponding to the source physical address and returns the target data to the DMA controller by using the ACP.

That the DMA controller stores the target data into storage space corresponding to a destination physical address of the target data by using the ACP in S202 may be: The DMA controller sends a data write request message including the target data and the destination physical address of the target data to the cache controller by using the ACP, so that the cache controller stores the target data into the storage space corresponding to the destination physical address of the target data.

In the data copying method provided in this embodiment of the present invention, a DMA controller reads, by using an ACP, target data from storage space that corresponds to a source physical address of the target data and that is in a first buffer, and then stores, by using the ACP, the target data into storage space that corresponds to a target physical address of the target data and that is in a second buffer, to complete copying data between the first buffer and the second buffer without using a CPU to copy data, thereby lowering CPU usage.

Embodiment 2

Embodiment 2 of the present invention further provides a data copying method. FIG. 3 is a schematic diagram of a computer system to which another data copying method is applied according to the present invention. Based on FIG. 1, the computer system 100 shown in FIG. 3 may further include: a memory management unit (MMU) 301. The DMA controller 102 may be connected to the MMU 301, and the MMU 301 may communicate with the buffers 109 in the cache memory 108 by using the ACP 111. The CACHE 108 may further include a cache controller 302, so as to control read and write of the buffers 109 in the CACHE 108.

Figure 4:
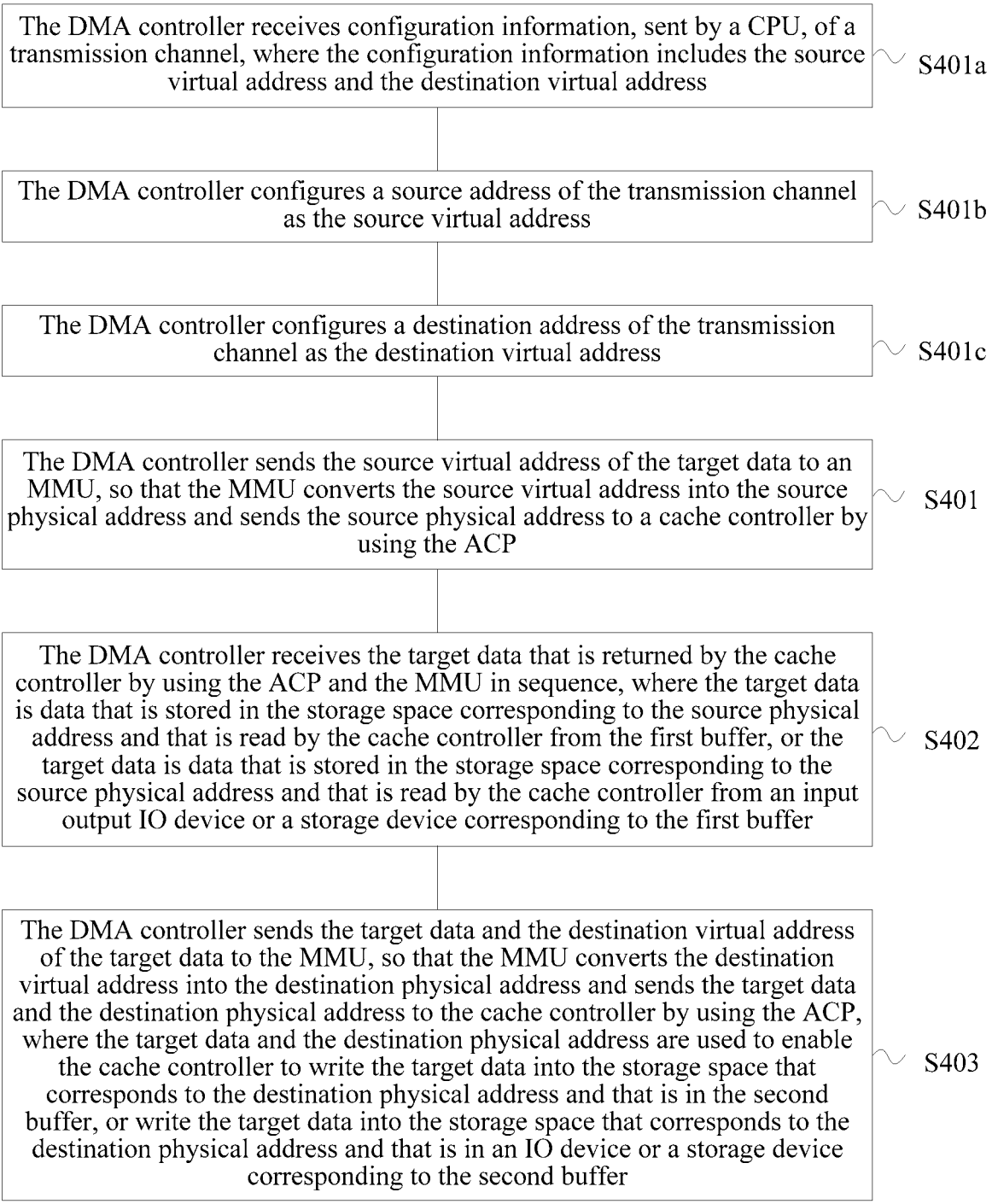
FIG. 4 is a flowchart of a data copying method according to Embodiment 2 of the present invention.

FIG. 4 is a flowchart of a data copying method according to Embodiment 2 of the present invention. As shown in FIG. 4, based on Embodiment 1, in this method, that a DMA controller reads target data from storage space corresponding to a source physical address of the target data by using an ACP in S201 may include:

S401: The DMA controller sends a source virtual address of the target data to an MMU, so that the MMU converts the source virtual address into the source physical address and sends the source physical address to a cache controller by using the ACP.

S402: The DMA controller receives the target data that is returned by the cache controller by using the ACP and the MMU in sequence, where the target data is data that is stored in the storage space corresponding to the source physical address and that is read by the cache controller from the first buffer, or the target data is data that is stored in the storage space corresponding to the source physical address and that is read by the cache controller from an input output IO device or a storage device corresponding to the first buffer.

Specifically, after receiving the source physical address, of the target data, sent by the DMA controller by using the MMU and the ACP in sequence, the cache controller determines whether the source physical address is hit in the first buffer. The determining, by the cache controller, whether the source physical address is hit in the first buffer may be determining whether the first buffer includes the storage space corresponding to the source physical address. If the first buffer includes the storage space corresponding to the source physical address, the source physical address is hit in the first buffer; otherwise, the source physical address is not hit in the first buffer. If the source physical address is hit in the first buffer, the cache controller reads the target data from the storage space that corresponds to the source physical address and that is in the first buffer. If the source physical address is not hit in the first buffer, the cache controller reads the target data from the storage space that corresponds to the source physical address and that is in an IO device or a storage device corresponding to the first buffer.

It should be noted that before sending the source physical address to the cache controller by using the ACP, the MMU further needs to determine, according to the source physical address, whether cache attribute information of the source physical address indicates a cacheable attribute (cacheable) or a non-cacheable attribute (non-cacheable). If the cache attribute information of the source physical address indicates a cacheable attribute, the MMU sends the source physical address to the cache controller by using the ACP. If the cache attribute information of the source physical address indicates a non-cacheable attribute, the MMU may directly send the source physical address to the IO device or storage device corresponding to the first buffer.

Optionally, that the DMA controller stores the target data into storage space corresponding to a destination physical address of the target data by using the ACP in S202 may include:

S403: The DMA controller sends the target data and a destination virtual address of the target data to the MMU, so that the MMU converts the destination virtual address into the destination physical address and sends the target data and the destination physical address to the cache controller by using the ACP, where the target data and the destination physical address are used to enable the cache controller to write the target data into the storage space that corresponds to the destination physical address and that is in the second buffer, or write the target data into the storage space that corresponds to the destination physical address and that is in an IO device or a storage device corresponding to the second buffer.

Specifically, after receiving the target physical address that is sent by the DMA controller by using the MMU and the ACP in sequence, the cache controller determines whether the destination physical address is hit in the second buffer. The determining, by the cache controller, whether the destination physical address is hit in the second buffer may be determining whether the second buffer includes the storage space corresponding to the destination physical address. If the second buffer includes the storage space corresponding to the destination physical address, the destination physical address is hit in the second buffer; otherwise, the destination physical address is not hit in the second buffer. If the destination physical address is hit in the second buffer, the cache controller may write the target data into the storage space that corresponds to the destination physical address and that is in the second buffer; if the destination physical address is not hit in the second buffer, the cache controller may write the target data into the storage space that corresponds to the destination physical address and that is in an IO device or a storage device corresponding to the second buffer.

It should be noted that before sending the destination physical address to the cache controller by using the ACP, the MMU further needs to determine, according to the destination physical address, whether cache attribute information of the destination physical address indicates a cacheable attribute or a non-cacheable attribute. If the cache attribute information of the destination physical address indicates a cacheable attribute, the MMU sends the target data and the destination physical address to the cache controller by using the ACP. If the cache attribute information of the destination physical address indicates a non-cacheable attribute, the MMU may directly send the target data and the destination physical address to the IO device or storage device corresponding to the second buffer.

The cache attribute information of the source physical address and the cache attribute information of the destination physical address may be configured by the kernel of the CPU.

Optionally, the MMU may determine, according to the source virtual address and a corresponding relationship between the source virtual address and a physical address, that the physical address corresponding to the source virtual address is the source physical address. The MMU may determine, according to the destination virtual address and a corresponding relationship between the destination virtual address and a physical address, that the physical address corresponding to the destination virtual address is the destination physical address. If the target data includes at least one piece of data, at least one address in the source virtual address may be continuous, and at least one address in the source virtual address has a physical address. Therefore, the source physical address may also include at least one address, and at least one address in the source physical address may be discontinuous.

At least one address in the destination virtual address may also be continuous. At least one address in the destination virtual address has a physical address. Therefore, the destination physical address may also include at least one address, and at least one address in the destination physical address may be discontinuous.

If the target data includes at least one piece of data, the DMA controller may convert, by using the MMU, at least one continuous address in the source virtual address of the target data into a source physical address including at least one discontinuous address; the DMA controller may also convert, by using the MMU, at least one continuous address in the destination virtual address of the target data into a destination physical address including at least one discontinuous address. That is, in this embodiment, the DMA controller may implement data copying between storage space corresponding to discontinuous, namely, fragmented physical addresses by using the MMU and the ACP in sequence according to a continuous virtual address.

Optionally, before the sending, by the DMA controller, a source virtual address of the target data to an MMU in S401, the method may further include:

S401a: The DMA controller receives configuration information, sent by a CPU, of a transmission channel, where the configuration information includes the source virtual address and the destination virtual address.

S401b: The DMA controller configures a source address of the transmission channel as the source virtual address.

S401c: The DMA controller configures a destination address of the transmission channel as the destination virtual address.

Specifically, the target data may include at least one piece of data, and each piece of data may include a corresponding source address and destination address. The source virtual address of the target data may include at least one address, and the destination virtual address of the target data may also include at least one address. In the DMA controller, each piece of data in the target data has a transmission channel; therefore, a transmission channel that is in the DMA controller and that corresponds to the target data may include at least one channel. For example, the DMA controller may configure, according to at least one address in the source virtual address, a source address of each channel of the at least one channel as a source address that corresponds to each piece of data and that is in the at least one address of the source virtual address. For example, the DMA controller may configure, according to at least one address in the destination virtual address, a destination address of each channel as a destination address that corresponds to each piece of data and that is in the at least one address of the destination virtual address. The different channels are separately used to transmit different data in the target data, and different channels of the at least one channel have different source addresses and different destination addresses.

Optionally, the configuration information may also include a number of transmitted data bytes, a transmission bit width, a burst length, and the like of each channel in the transmission channel.

The DMA controller further separately configures a number of transmitted data bytes, a transmission bit width, a burst length, and the like of each channel of at least one channel in the transmission channel according to the number of transmitted data bytes, the transmission bit width, the burst length, and the like, in the configuration information, of each channel in the transmission channel.

It should be noted that a process that the DMA controller configures the channel according to the configuration information sent by the CPU may be executed in a state in which the DMA controller is not started. That is, after the DMA controller completes channel configuration according to parameters in the configuration information sent by the CPU, the DMA controller further needs to be started, so that when processes running in the computer system need to copy target data, the CPU sends a working instruction to the DMA controller, so that the DMA controller sends the source virtual address to the MMU, and then the source physical address that is obtained by means of conversion is sent to the first buffer by using the ACP, so as to read the target data.

In the data copying method in Embodiment 2 of the present invention, a DMA controller may implement data copying between storage space of discontinuous, namely, fragmented physical addresses by using an MMU and an ACP in sequence according to a continuous virtual address. Besides, in a process that the DMA controller copies data, no matter the data is read or stored, a buffer needs to be used, so as to implement cache-coherent memory access and a CPU does not need to call an instruction frequently, thereby further lowering CPU usage, ensuring performance of a computer system, and reducing power consumption.

Further, processes running in the computer system may run in a user mode or may run in a kernel mode. If a process requiring data interaction runs in a kernel mode, a source address and a destination address that are specific to the process running in the kernel mode and that are configured by the CPU for the DMA controller are a source physical address and a destination physical address, so that the DMA controller copies data by using the ACP. However, if a process requiring data interaction runs in a user mode, a source address and a destination address that are specific to the process running in the user mode and that are configured by the CPU for a transmission channel of the DMA controller are a source virtual address and a destination virtual address. In this case, the DMA controller cannot move or copy target data according to the source virtual address and the destination virtual address but needs to send the source virtual address and the destination virtual address to the MMU so that the MMU converts the source virtual address and the destination virtual address into a source physical address and a destination physical address, and then the DMA controller copies data by using the ACP.

Embodiment 3

Figure 5:
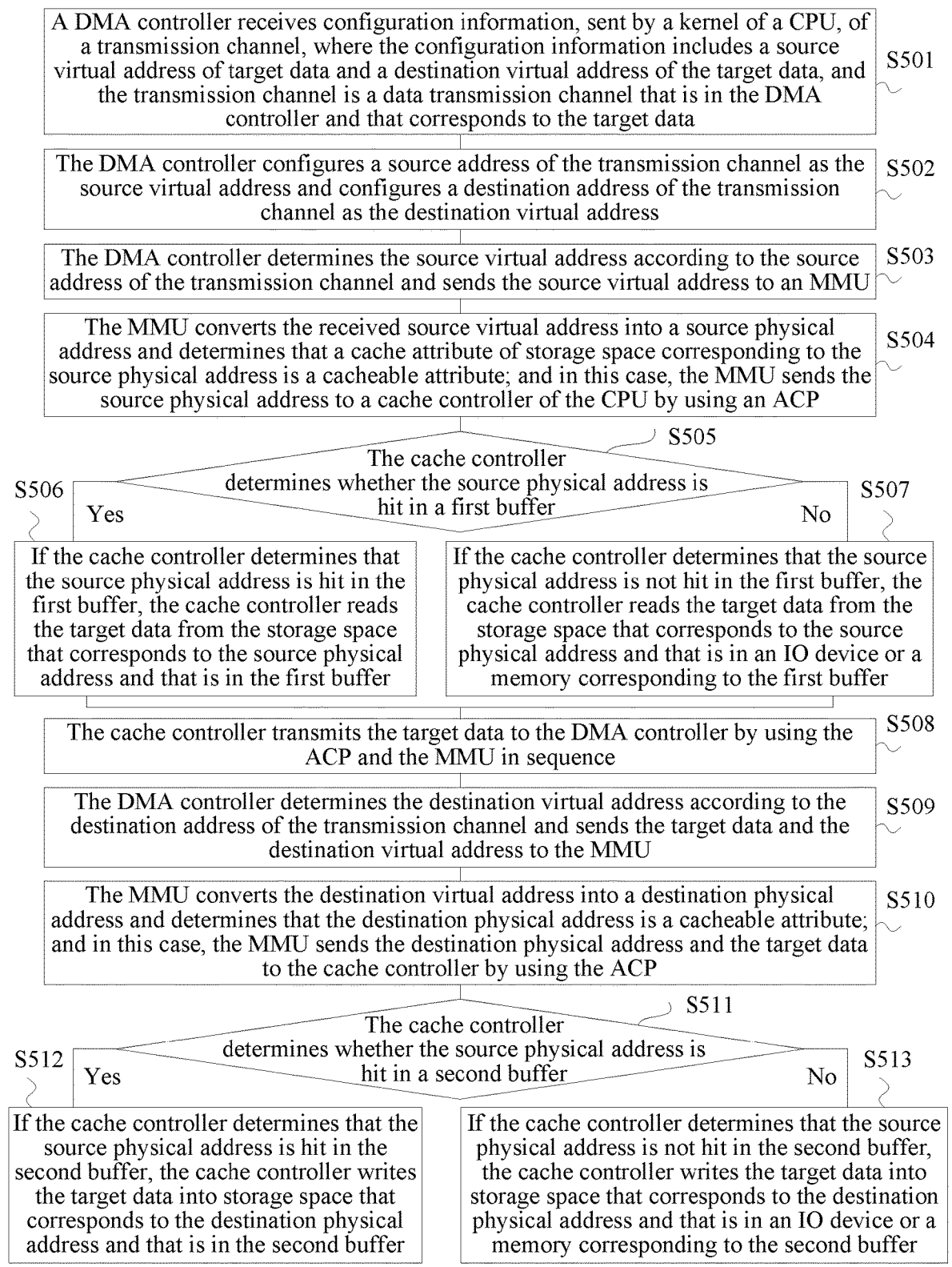
FIG. 5 is a flowchart of a data copying method according to Embodiment 3 of the present invention.

Embodiment 3 of the present invention further provides a data copying method. FIG. 5 is a flowchart of a data copying method according to Embodiment 3 of the present invention. As shown in FIG. 5, the data copying method may include:

S501: A DMA controller receives configuration information, sent by a kernel of a CPU, of a transmission channel, where the configuration information includes a source virtual address of target data and a destination virtual address of the target data; and the transmission channel is a data transmission channel that is in the DMA controller and that corresponds to the target data.

S502: The DMA controller configures a source address of the transmission channel as the source virtual address and configures a destination address of the transmission channel as the destination virtual address.

The configuration information may also include a number of transmitted data bytes, a transmitted data bit width, and a burst length of the transmission channel. Therefore, the DMA controller further separately configures the number of transmitted data bytes, the transmitted data bit width, and the burst length in the configuration information as a number of transmitted data bytes, a transmitted data bit width, and a burst length of the transmission channel.

It should be noted that after configuring the transmission channel according to S502, the DMA controller starts receiving a data copying instruction sent by the CPU.

S503: The DMA controller determines the source virtual address according to the source address of the transmission channel and sends the source virtual address to an MMU.

S504: The MMU converts the received source virtual address into a source physical address and determines that a cache attribute of storage space corresponding to the source physical address is a cacheable attribute; and in this case, the MMU sends the source physical address to a cache controller of the CPU by using an ACP.

S505: The cache controller determines whether the source physical address is hit in a first buffer.

If the source physical address is hit in the first buffer, go to S506; if the source physical address is not hit in the first buffer, go to S507.

S506: If the cache controller determines that the source physical address is hit in the first buffer, the cache controller reads the target data from the storage space that corresponds to the source physical address and that is in the first buffer.

S507: If the cache controller determines that the source physical address is not hit in the first buffer, the cache controller reads the target data from the storage space that corresponds to the source physical address and that is in an IO device or a memory corresponding to the first buffer.

S508: The cache controller transmits the target data to the DMA controller by using the ACP and the MMU in sequence.

S509: The DMA controller determines the destination virtual address according to the destination address of the transmission channel and sends the target data and the destination virtual address to the MMU.

S510: The MMU converts the destination virtual address into a destination physical address and determines that the destination physical address is a cacheable attribute; and in this case, the MMU sends the destination physical address and the target data to the cache controller by using the ACP.

S511: The cache controller determines whether the source physical address is hit in a second buffer.

If the cache controller determines the source physical address is hit in a second buffer, go to S512; if the cache controller determines the source physical address is not hit in the second buffer, go to S513.

S512: If the cache controller determines that the source physical address is hit in the second buffer, the cache controller writes the target data into storage space that corresponds to the destination physical address and that is in the second buffer.

S513: If the cache controller determines that the source physical address is not hit in the second buffer, the cache controller writes the target data into storage space that corresponds to the destination physical address and that is in an IO device or a memory corresponding to the second buffer.

In the data copying method provided in this embodiment of the present invention, in a computer system, a DMA controller reads, by using an ACP, target data from storage space that corresponds to a source physical address of the target data and that is in a first buffer, and then stores, by using the ACP, the target data into storage space that corresponds to a destination physical address of the target data and that is in a second buffer, to complete copying data between the first buffer and the second buffer without using a CPU to call a response function to copy data, thereby lowering CPU usage and improving working performance of the computer system.

Embodiment 4

Figure 6:
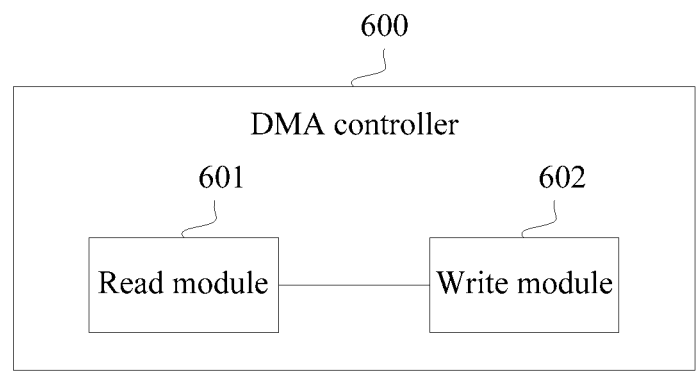
FIG. 6 is a schematic structural diagram of a DMA controller according to Embodiment 4 of the present invention.

Embodiment 4 of the present invention further provides a DMA controller. FIG. 6 is a schematic structural diagram of a DMA controller according to Embodiment 4 of the present invention. As shown in FIG. 6, the DMA controller 600 may include:

a read module 601, configured to read target data from storage space corresponding to a source physical address of the target data by using an ACP, where the storage space corresponding to the source physical address includes a first buffer; and a write module 602, configured to store the target data into storage space corresponding to a destination physical address of the target data by using the ACP, where the storage space corresponding to the destination physical address includes a second buffer.

Optionally, the DMA controller 600 further includes:

a sending module, configured to send a source virtual address of the target data to an MMU, so that the MMU converts the source virtual address into the source physical address and sends the source physical address to a cache controller by using the ACP; and a receiving module, configured to receive the target data that is returned by the cache controller by using the ACP and the MMU in sequence, where the target data is data that is stored in the storage space corresponding to the source physical address and that is read by the cache controller from the first buffer, or the target data is data that is stored in the storage space corresponding to the source physical address and that is read by the cache controller from an input output IO device or a storage device corresponding to the first buffer.

Optionally, the sending module is further configured to send the target data and a destination virtual address of the target data to the MMU, so that the MMU converts the destination virtual address into the destination physical address and sends the target data and the destination physical address to the cache controller by using the ACP, where the target data and the destination physical address are used to enable the cache controller to write the target data into the storage space that corresponds to the destination physical address and that is in the second buffer, or write the target data into the storage space that corresponds to the destination physical address and that is in an IO device or a storage device corresponding to the second buffer.

Optionally, the receiving module is further configured to: before the sending module sends the source virtual address of the target data to the MMU, receive configuration information, sent by CPU, of a transmission channel, where the configuration information includes the source virtual address and the destination virtual address, and the transmission channel is a data transmission channel that is in the DMA controller and that corresponds to the target data.

The DMA controller 600 further includes:

a configuration module, configured to configure a source address of the transmission channel as the source virtual address and configure a destination address of the transmission channel as the destination virtual address.

The DMA controller provided in Embodiment 4 of the present invention may execute the data copying method of any embodiment in Embodiment 1 to Embodiment 3; and a specific implementation process and a beneficial effect of Embodiment 4 are similar to those of the foregoing embodiments. Details are not described therein again.

Embodiment 5

Figure 7:
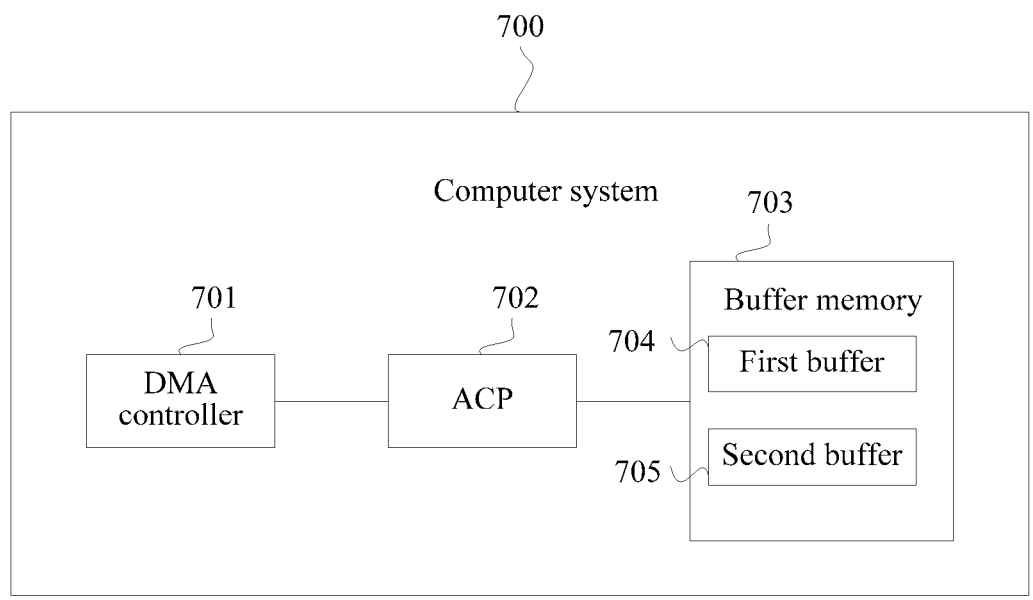
FIG. 7 is a schematic structural diagram of a computer system according to Embodiment 5 of the present invention.

Embodiment 5 of the present invention further provides a computer system. FIG. 7 is a schematic structural diagram of a computer system according to Embodiment 5 of the present invention. As shown in FIG. 7, the computer system 700 may include: a DMA controller 701, an ACP 702, and a buffer memory 703, where the DMA controller 701 is connected to the buffer memory 703 by using the ACP 702, and the buffer memory 703 includes a first buffer 704 and a second buffer 705.

The DMA controller 701 may be the DMA controller of Embodiment 4 and may be used to execute the data copying method of any embodiment in Embodiment 1 to Embodiment 3.

The DMA controller in the computer system provided in Embodiment 5 of the present invention may execute the data copying method of any embodiment of Embodiment 1 to Embodiment 3; and an implementation process and a beneficial effect thereof are similar to those of Embodiment 1 to Embodiment 3. Details are not described therein again.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method for copying a target data from a first storage space corresponding to a first buffer to a second storage space corresponding to a second buffer, the method comprising:
    reading, by a direct memory access (DMA) controller communicating with the first buffer using an accelerator coherency port (ACP), the target data from the first storage space corresponding to a source physical address; and
    storing, by the DMA controller communicating with the second buffer using the ACP, the target data obtained during the reading into the second storage space corresponding to a destination physical address,
    wherein the source physical address corresponds to the first buffer,
    wherein the destination physical address corresponds to the second buffer, and
    wherein a processor cache memory comprises the first buffer and the second buffer.

2. The method according to claim 1, wherein the reading, by a DMA controller, target data from storage space corresponding to a source physical address of the target data by using an ACP comprises:
    sending, by the DMA controller, a source virtual address of the target data to a memory management unit (MMU), so that the MMU converts the source virtual address into the source physical address and sends the source physical address to a cache controller by using the ACP; and
    receiving, by the DMA controller, the target data that is returned by the cache controller by using the ACP and the MMU in sequence, wherein the target data is data that is stored in the storage space corresponding to the source physical address and that is read by the cache controller from the first buffer, or the target data is data that is stored in the storage space corresponding to the source physical address and that is read by the cache controller from an input output (IO) device or a storage device corresponding to the first buffer.

3. The method according to claim 2, wherein the storing, by the DMA controller, the target data into storage space corresponding to a destination physical address of the target data by using the ACP comprises:
    sending, by the DMA controller, the target data and a destination virtual address of the target data to the MMU, so that the MMU converts the destination virtual address into the destination physical address and sends the target data and the destination physical address to the cache controller by using the ACP, wherein the target data and the destination physical address are used to enable the cache controller to write the target data into the storage space that corresponds to the destination physical address and that is in the second buffer, or write the target data into the storage space that corresponds to the destination physical address and that is in an IO device or a storage device corresponding to the second buffer.

4. The method according to claim 3, wherein before the sending, by the DMA controller, a source virtual address of the target data to the MMU, the method further comprises:
    receiving, by the DMA controller, configuration information, sent by a central processing unit (CPU), of a transmission channel, wherein the configuration information comprises the source virtual address and the destination virtual address, and the transmission channel is a data transmission channel that is in the DMA controller and that corresponds to the target data;
    configuring, by the DMA controller, a source address of the transmission channel as the source virtual address; and
    configuring, by the DMA controller, a destination address of the transmission channel as the destination virtual address.

5. A direct memory access (DMA) controller configured for copying a target data from a first storage space corresponding to a first buffer to a second storage space corresponding to a second buffer, comprising:
    a read module, configured to read, by communicating with the first buffer using an accelerator coherency port (ACP), the target data from the first storage space corresponding to a source physical address; and
    a write module, configured to store, communicating with the second buffer using the ACP, the target data into the second storage space corresponding to a destination physical address,
    wherein the source physical address corresponds to the first buffer,
    wherein the destination physical address corresponds to the second buffer, and
    wherein a processor cache memory comprises the first buffer and the second buffer.

6. The DMA controller according to claim 5, wherein the DMA controller further comprises:
    a sending module, configured to send a source virtual address of the target data to a memory management unit (MMU), so that the MMU converts the source virtual address into the source physical address ad sends the source physical address to a cache controller by using the ACP; and
    a receiving module, configured to receive the target data that is returned by the cache controller by using the ACP and the MMU in sequence, wherein the target data is data that is stored in the storage space corresponding to the source physical address and that is read by the cache controller from the first buffer, or the target data is data that is stored in the storage space corresponding to the source physical address and that is read by the cache controller from an input output (IO) device or a storage device corresponding to the first buffer.

7. The DMA controller according to claim 6, wherein the sending module is further configured to send the target data and a destination virtual address of the target data to the MMU, so that the MMU converts the destination virtual address into the destination physical address and sends the target data and the destination physical address to the cache controller by using the ACP, wherein the target data and the destination physical address are used to enable the cache controller to write the target data into the storage space that corresponds to the destination physical address and that is in the second buffer, or write the target data into the storage space that corresponds to the destination physical address and that is in an IO device or a storage device corresponding to the second buffer.

8. The DMA controller according to claim 7, wherein the receiving module is further configured to: before the sending module sends the source virtual address of the target data to the MMU, receive configuration information, sent by a central processing unit (CPU), of a transmission channel, wherein the configuration information comprises the source virtual address and the destination virtual address, and the transmission channel is a data transmission channel that is in the DMA controller and that corresponds to the target data; and
the DMA controller further comprises:
a configuration module, configured to configure a source address of the transmission channel as the source virtual address and configure a destination address of the transmission channel as the destination virtual address.

9. A computer system, comprising:
a direct memory access (DMA) controller,
an accelerator coherency port (ACP), and
a processor cache memory comprising a first buffer and a second buffer,
wherein the DMA controller is communicatively connected to the processor cache memory by using the ACP; and
wherein the DMA controller is configured to carry out a method for copying a target data from a first storage space corresponding to the first buffer to a second storage space corresponding to the second buffer, the method comprising:
reading, by the direct memory access (DMA) controller communicating with the first buffer using an accelerator coherency port (ACP), the target data from the first storage space corresponding to a source physical address; and
storing, by the DMA controller communicating with the second buffer using the ACP, the target data obtained during the reading into a second storage space corresponding to a destination physical address,
wherein the source physical address corresponds to the first buffer,
wherein the destination physical address corresponds to the second buffer, and
wherein a processor cache memory comprises the first buffer and the second buffer.

* * * * *